Patented Dec. 19, 1933

1,940,393

UNITED STATES PATENT OFFICE 1,940,393

PROCESS FOR BREAKING PETROLEUM EMULSIONS

Melvin De Groote, St. Louis, and Arthur F. Wirtel, Richmond Heights, Mo., assignors to Tretolite Company, Webster Groves, Mo., a corporation of Missouri No Drawing. Application January 21, 1933 Serial No. 652,943

6 Claims. (Cl. 196—4)

This invention relates to the treatment of emulsions of mineral oil and water, such as petroleum emulsions, for the purpose of separating the oil from the water.

Petroleum emulsions are of the water-in-oil type, and comprise fine droplets of naturally-occurring waters or brines, dispersed in a more or less permanent state throughout the oil which constitutes the continuous phase of the emulsion. They are obtained from producing wells and from the bottoms of oil storage tanks, and are commonly referred to as "cut oil", "roily oil", "emulsified oil" and "bottom settlings".

The object of our invention is to provide a novel, inexpensive and efficient process for separating emulsions of the kind referred to into their component parts of oil and water or brine.

Briefly described, our process consists in subjecting a petroleum emulsion of the water-in-oil type to the action of a treating agent or demulsifying agent of a particular composition hereinafter described, thereby causing the emulsion to break down and separate into its component parts of oil and water or brine, when the emulsion is permitted to remain in a quiescent state after such treatment.

Various classes of materials have heretofore been used or suggested as demulsifying agents in the resolution of petroleum emulsions, such as water softeners, modified fatty acids, hydroxy aromatics, various non-fatty sulfonic acids, etc. Mixtures of materials of the kind above mentioned have also been used or suggested, sometimes with improved results and sometimes with inferior results.

Generally, when various classes of materials are efficient demulsifiers, mixtures of such materials are also efficient demulsifiers, provided that the materials constituting a mixture are not incompatible, but the value or effectiveness of a mixture produced by combining a known demulsifier selected from one class with another known demulsifier selected from a different class, can easily be determined by simple routine chemical experimentation involving only chemical skill or knowledge, as distinguished from inventive ability. There have been instances where particular petroleum emulsions or particular types of emulsion would not respond to treatment with the individual members of a class or classes of demulsifiers, or with mixtures produced from selected members of two different classes of known demulsifiers, and when such emulsions are encountered, inventive ability is often required to produce a demulsifying agent that will successfully "break" or treat the emulsion under consideration. An example of a demulsifying agent of the kind last referred to is the one described in U. S. Patent No. 1,659,998, to Keiser, dated February 21, 1928, which demulsifying agent consists of a mixture of previously known demulsifiers, combined in certain specific proportions.

The treating agent or demulsifying agent contemplated by our process is of the kind that is composed of a mixture of materials, but it is also of that particular type of mixture which is characterized by great specificity both in the substances of which it is composed, and in the quantities or proportions of said substances. It consists of or comprises red oil (oleic acid), which is a non-modified fatty material, mixed with certain specific substituted aromatic sulfonic acids or salts thereof. Any or all fatty acids are not suitable, and any or all substituted aromatic sulfonic acid or salts are not suitable. On the contrary, only red oil mixed with a substituted aromatic sulfonic acid or salt of the particular kind herein described and defined, contemplated by our invention. We have not found stearic acid, palmitic acid, and the like to be suitable in replacing red oil or oleic acid in the mixture, even though they are the equivalents of red oil for the ordinary process of soap making.

The substituted aromatic sulfonic acids or salts employed as a part of the mixture are limited to those derived from alcohols having three carbon atoms and not more than five carbon atoms; i. e., propyl alcohol, butyl alcohol, and amyl alcohol. It is to be understood that the isomeric alcohols, such as normal butyl, isobutyl, secondary butyl, etc. are considered equally satisfactory, and that the isomeric sulfonic acids, such as the alpha and beta are also considered equally suitable for our specific reagent. The mixture is limited to the alkylated naphthalene sulfonic acids in the form of a water-soluble alkali salt. The ammonium radical is considered an alkali along with the metals sodium and potassium. Ammonium hydroxide is just as satisfactory for neutralizing the sulfonic acids as is sodium or potassium hydroxide. Likewise, in the manufacture of ammonium soaps, for certain purposes, it has been found that improved products can sometimes be obtained by replacing the ammonia with certain hydroxy amines, such as triethanolamine, which acts just the same as ammonia. We wish it to be understood that hydroxyamines which act like ammonia are considered the equivalent of the ammonium radical or the equivalent of an alkali metal in our invention. These substituted naphthalene sulfonic acids of the type described represent only a small percentage of the large number of substituted polynuclear sulfonic acids. For instance substituted aromatic sulfonic acids disclosed for demulsification include those derived from the higher alkyl alcohols, as well as from aryl alcohols and aralkyl alcohols, and even cyclo alcohols. Furthermore, known demulsifiers include not only the substitution of alcohol radicals in the aromatic nucleus, but also sulfonic acids in which aldehyde residues, ketone residues, or even fatty residues are substituted in the aromatic nucleus. Then too, insead of introducing such residues into an aromatic nucleus, it has been suggested to introduce them into aromatic derivatives, such as hydroxy, chloro, nitro, or carboxyl derivatives. It has been suggested to use this multitude of sulfonic acids in the form of calcium or magnesium salts, or in the form of various esters or even after acylation with an amine in the manner that the sulfonyl radical substitutes or replaces one of the hydrogens of the selected amine.

We have selected a few members from this large class of aromatic substituted sulfonic acids, and as previously stated, we contemplate only the use of the propylated or butylated or amylated naphthalene sulfonic acid in the form of a sodium, potassium, or ammonium salt. We do not contemplate the use of a reagent in which some other substituent group, such as a hydroxyl group is present in the nucleus. Nor do we make a broad claim to mixtures of oleic acid and the particular aromatic sulfonic acid salts herein described.

Our invention is specifically limited to a demulsifying agent containing not over 40% of water, that will show oil solubility, as well as water solubility. Mixtures of the kind contemplated by our process must dissolve in kerosene and produce a 20% solution, that is, when 20 parts of the mixture is mixed with 80 parts of ordinary kerosene. Unless the mixture shows this oil solubility, it does not appear to have any unusual effectiveness in treating petroleum emulsions. The oleic acid may be replaced in part by the sodium, potassium or ammonium salt, that is, the sodium, potassium, or ammonium oleate. Hydroxyamines, such as triethanolamine, are suitable substitutes for ammonia hydroxide.

In addition to having the limiting characteristics previously set forth, the mixture contemplated by our process must also show water miscibility. In other words, the mixture, in addition to showing 20% oil solubility above described, must be capable of mixing with water to form a 5% solution or suspension of a relatively stable type.

The most feasible way for preparing a mixture of the kind previously described is to make a combination in which there is no more than three times as much of one type of reagent or material as the other. In other words, if three parts of the substituted naphthalene sulfonic acid is used, one must mix therewith not less than one part of oleic acid and not more than nine parts of oleic acid. The actual amount of oleic acid required depends on various factors, namely, whether the product is a monoalkylated aromatic salt, or contains more than one substituting alkyl radical. It also depends on whether or not there is only one sulfonic acid radical present, or if there is more than one. It also depends on the amount of water present, and to some degree, on whether or not the water present contains a considerable amount of dissolved inorganic salts, such as sodium sulfate, as an inherent impurity. Solubility is also effected dependent on the base used for neutralization. Generally speaking, potassium salts or ammonium salts show greater oil solubility than sodium salts. In any event, when the mixture of the substituted aromatic sulfonic acid salt and oleic acid is prepared, if oil solubility is not sufficient, a small amount of a base such as ammonia should then be added, so as to partially neutralize the oleic acid, and thus promote oil solubility. In the majority of cases, it is best that the mixture be made in the proportion of approximately one part of the substituted aromatic sulfonic acid salt and one part of oleic acid with subsequent neutralization.

Our preferred demulsifying agent is prepared in the following manner: A mixture of monobutylated and dibutylated naphthalene sulfonic acid salt is prepared in the customary manner and is neutralized with ammonia. If need be, it is concentrated so as to contain not over 40% of water, and preferably as little as 35% of water. It is mixed with an equal part of oleic acid and should show oil solubility when 20 parts of the mixture is shaken with 80 parts of kerosene. If said mixture does not possess such oil solubility, strong ammonium hydroxide is cautiously added with constant stirring and frequent tests made to determine the appearance of such desired oil solubility. Sometimes when such desired oil solubility is obtained, it may be desirable to continue to add some more of the neutralizing agent, such as ammonia, or caustic soda, or caustic potash, or triethanolamine, as the case may be, but in no event should the addition of the neutralizing agent be enough to eliminate the oil solubility. After the reagent has shown oil solubility of the kind described, it should be tested in water by preparing a 5% mixture. Such mixture should result in a stringy milky suspension, or even a clear solution. In other words, the mixture must show ready miscibility with water, as well as with oil. It should be understood that the expression "oleic acid" is used in the claims in the generic sense to mean oleic acid, or oleic acid partially saponified with caustic soda, caustic potash, ammonium hydroxide, triethanolamine, and the like. The final reagent may be used after dilution with kerosene or carbon tetrachloride, or a water-insoluble alcohol, such as amyl alcohol, or any other desired vehicle, which does not destroy the oil and water solubility of the kind previously noted. We prefer to add 25% of kerosene to the reagent.

We believe that from the foregoing it will be apparent that our invention is not concerned with all mixtures of two classes of materials which have been previously used for demulsification, but on the contrary, is concerned with only a very limited class or type of mixtures that must have the characteristic or quality of both oil and water miscibility. The superiority of the reagent or demulsifying agent contemplated by our process is based upon its ability to treat certain emulsions more advantageously and at a somewhat lower cost than is possible with other known demulsifiers. We have not found that our improved demulsifying agent is of universal effectiveness, and we do not believe that it will supersede the majority of the modified fatty acids, sulfated fatty acids, etc., heretofore used extensively as treating agents in the resolution of petroleum emulsions. It is believed that the particular demulsifying agent or treating agent herein described will find comparatively limited application, so far as the majority of oil field emulsions are concerned, but we have found that such a demulsifying agent has commercial value, as it will economically break or resolve certain oil field emulsions in a small number of cases which cannot be treated as easily and at so low a cost, with demulsifying agents heretofore available.

In practising our process, a treating agent or demulsifying agent of the kind above described may be brought in contact with the emulsion to be treated in any of the numerous ways now employed in the treatment of petroleum emulsions of the water-in-oil type with chemical demulsifying agents, such, for example, as by introducing the treating agent into the well in which the emulsion is produced; introducing the treating agent into a conduit through which the emulsion is flowing; introducing the treating agent into a tank in which the emulsion is stored; or introducing the treating agent into a container that holds a sludge obtained from the bottom of an oil storage tank. In some instances, it may be advisable to introduce the treating agent into a producing well in such a way that it will become mixed with water and oil that are emerging from the surrounding strata, before said water and oil enter the barrel of the well pump or the tubing up through which said water and oil flow to the surface of the ground. After treatment, the emulsion is allowed to stand in a quiescent state, usually in a settling tank, and usually at a temperature varying from atmospheric temperature to about 200° F., so as to permit the water or brine to separate from the oil, it being preferable to keep the temperature low enough to prevent the volatilization of valuable constituents of the oil. If desired, the treated emulsion may be acted upon by one or more of the various kinds of apparatus now used in the operation of breaking petroleum emulsions, such as homogenizers, hay tanks, gun barrels, filters, centrifuges, or electrical dehydrators.

The amount of treating agent that may be required to break the emulsion may vary from approximately 1 part of treating agent to 500 parts of emulsion, up to 1 part of treating agent to 20,000 or even 30,000 parts of emulsion. The proportion depends on the type of emulsion being treated, and also upon the equipment being used, and the temperature employed. In treating exceptionally refractory emulsions of the kinds known as "tank bottoms" and "residual pit oils", the ratio of 1:500, above referred to, may be required. In treating fresh emulsions, i. e., emulsions that will yield readily to the action of chemical demulsifying agents, the ratio of 1:30,000, above referred to, may be sufficient to produce highly satisfactory results. In general, we have found that for an average petroleum emulsion, a ratio of 1 part of treating agent to 5,000 parts of emulsion will usually be found to produce commercially satisfactory results.

Having thus described our invention, what we claim as new and desire to secure by Letters Patent is:

1. A process for breaking petroleum emulsions of the water-in-oil type, which consists in subjecting the emulsion to the action of an oil and water-soluble demulsifying agent containing (A) not over 40% of water; (B) a water-soluble alkali salt of alkylated naphthalene sulfonic acid derived from an alcohol having at least three carbon atoms and not more than five carbon atoms; and (C) a material chosen from the group consisting of oleic acid and oleic acid partially saponified with a substance of the class consisting of the alkalis, ammonia and triethanolamine, the said mixture also being characterized by the fact that the ratio of B to C is within the limits of 1 to 3 and 3 to 1 and that the demulsifying agent will produce a 20% solution in kerosene and a 5% solution or suspension in water.

2. A process for breaking petroleum emulsions of the water-in-oil type, which consists in subjecting the emulsion to the action of an oil and water-soluble demulsifying agent containing (A) not over 40% of water; (B) a water-soluble alkali salt of a butylated naphthalene sulfonic acid; and (C) a material chosen from the group consisting of oleic acid and oleic acid partially saponified with a substance of the class consisting of the alkalis, ammonia and triethanolamine, the said mixture also being characterized by the fact that the ratio of B to C is within the limits of 1 to 3 and 3 to 1 and that the demulsifying agent will produce a 20% solution in kerosene and a 5% solution or suspension in water.

3. A process for breaking petroleum emulsions of the water-in-oil type, which consists in subjecting the emulsion to the action of an oil and water-soluble demulsifying agent containing (A) not over 40% of water; (B) a water-soluble ammonium salt of a butylated naphthalene sulfonic acid; and (C) a material chosen from the group consisting of oleic acid and oleic acid partially saponified with a substance of the class consisting of the alkalis, ammonia and triethanolamine, the said mixture also being characterized by the fact that the ratio of B to C is within the limits of 1 to 3 and 3 to 1 and that the demulsifying agent will produce a 20% solution in kerosene and a 5% solution or suspension in water.

4. A process for breaking petroleum emulsions of the water-in-oil type, which consists in subjecting the emulsion to the action of an oil and water-soluble demulsifying agent containing (A) not over 40% of water; (B) a water-soluble ammonium salt of a butylated naphthalene sulfonic acid; and (C) oleic acid in an amount approximately equal to the amount of B, the said mixture also being characterized by the fact that the demulsifying agent will produce a 20% solution in kerosene and a 5% solution or suspension in water.

5. A process for breaking petroleum emulsions of the water-in-oil type, which consists in subjecting the emulsion to the action of an oil and water-soluble demulsifying agent containing (A) not over 40% of water; (B) a water-soluble ammonium salt of a butylated naphthalene sulfonic acid; and (C) oleic acid in an amount approximately equal to the amount of B and partially saponified with ammonium hydroxide, the said mixture also being characterized by the fact that the demulsifying agent will produce a 20% solution in kerosene and a 5% solution or suspension in water.

6. A process for breaking petroleum emulsions of the water-in-oil type, which consists in subjecting the emulsion to the action of an oil and water-soluble demulsifying agent containing (A) not over 40% of water; (B) a water-soluble ammonium salt of a butylated naphthalene sulfonic acid; and (C) oleic acid in an amount approximately equal to the amount of B, partially saponified with ammonium hydroxide diluted with 25% of kerosene, the said mixture also being characterized by the fact that the demulsifying agent will produce a 20% solution in kerosene and a 5% solution or suspension in water.

MELVIN DE GROOTE.
ARTHUR F. WIRTEL.